United States Patent [19]
Yasuhara

[11] Patent Number: 5,465,036
[45] Date of Patent: Nov. 7, 1995

[54] CONTROL APPARATUS OF ROBOT

[75] Inventor: Masateru Yasuhara, Kawasaki, Japan

[73] Assignee: Canon Kabushiki Kaisha, Tokyo, Japan

[21] Appl. No.: 163,655

[22] Filed: Dec. 8, 1993

[30] Foreign Application Priority Data

Dec. 11, 1992 [JP] Japan .................................. 4-332081

[51] Int. Cl.$^6$ .................................................. G05B 19/18
[52] U.S. Cl. .................. 318/568.11; 318/568.1; 318/573
[58] Field of Search ......................... 318/560–646; 395/80–99; 901/3, 5, 7, 9, 15, 17, 19; 219/125.12

[56] References Cited

U.S. PATENT DOCUMENTS

| | | | |
|---|---|---|---|
| 3,575,301 | 4/1971 | Panissidi | 214/147 |
| 3,920,972 | 11/1975 | Corwin, Jr. et al. | 318/568.11 |
| 4,021,651 | 5/1977 | Mitsuhashi et al. | 235/151.11 |
| 4,060,848 | 11/1977 | Hyatt | 364/200 |
| 4,121,284 | 10/1978 | Hyatt | 364/200 |
| 4,420,812 | 12/1983 | Ito et al. | 318/573 |
| 4,870,247 | 9/1989 | Fukuoka et al. | 219/125.1 |
| 4,954,761 | 9/1990 | Kimura et al. | 318/568.1 |
| 5,075,533 | 12/1991 | Fukuoka et al. | 219/125.11 |
| 5,079,491 | 1/1992 | Nose et al. | 318/568.1 |
| 5,150,024 | 9/1992 | Kimura et al. | 318/568.1 |
| 5,171,966 | 12/1992 | Fukuoka et al. | 219/125.12 |

*Primary Examiner*—Paul Ip
*Attorney, Agent, or Firm*—Robin, Blecker, Daley & Driscoll

[57] ABSTRACT

A robot of the type having a moving member which is movably attached to a base includes control apparatus for controlling the operation of the moving member, the control apparatus having data setting facility for setting both origin search data and offset data to control the operation of the moving member. The data setting facility provides visible indication of both the origin search data and the offset data.

24 Claims, 9 Drawing Sheets

| | SEARCH<br>START COUNT – END COUNT |
|---|---|
| 0 | 500 – 2500 |
| 1 | 1000 – 3000 |
| 2 | 1500 – 3500 |
| 3 | 2000 – 4000 |
| 4 | 2500 – 4500 |
| 5 | 3000 – 5000 |
| ⋮ | ⋮ |
| F | 8000 – 10000 |

FIG. 8

CASE OF THAT OVERLAP AMOUNT IS 1500 COUNTS AND A STEP IS 500 COUNTS

CONTROL APPARATUS OF ROBOT

BACKGROUND OF THE INVENTION

1. Field of the Invention

The invention relates to a robot control apparatus and, more particularly, to the improvement of the setting of offset data for coordinate conversion and the setting of an origin search range.

2. Related Background Art

For example, in an arm of the robot apparatus, when a servo is once released, the operation to find out the origin is necessary to enable the robot to be used after that. Since the operation to find out the origin must be such that the origin can be found out within a predetermined range, it is necessary to set an origin search range.

A conventional range setting apparatus to set origin search range data is constructed as follows. The origin search range data which is used check an error in the origin search operation is obtained and set into a control apparatus of the robot. The range setting apparatus is constructed by a keyboard and a CPU to execute those controls. Two data of "search start count number" and "search end count number" are inputted from the keyboard to one motor and are sent to the control apparatus of the robot by the CPU. The control apparatus of the robot receives the data of the "search start count number" and "search end count number" which were sent and stores them into an internal nonvolatile RAM.

The robot apparatus has the following inherent problems. That is, differences among the apparatuses due to manufacturing errors or the like exist. In the robot control apparatus, therefore, an apparatus for compensating an offset amount which is generated due to such differences is needed. An offset setting apparatus is provided for this purpose. The conventional offset data setting apparatus for the coordinate conversion in the robot control apparatus is constructed as follows.

First, offset data to compensate the differences among the apparatuses which occur due to the errors or the like on manufacturing of the robot is obtained by measurements. The obtained offset data is set by the offset data setting apparatus.

The offset setting apparatus is constructed by a display apparatus, a keyboard, and a CPU to control them. The offset data inputted from the keyboard is sent to the control apparatus of the robot by the CPU. The robot control apparatus receives the offset data sent from the setting apparatus and stores into an internal nonvolatile RAM. The offset data stored is stored into an RAM different from the above nonvolatile RAM at the time of an initializing process of the control apparatus of the robot and is used in a coordinate converting process.

However, according to the conventional method of setting the origin search range, the origin search range data setting apparatus is constructed by the keyboard and the display apparatus and there are drawbacks such that it is necessary to set the two data of "search start count number" and "search end count number" into one motor as origin search range data and that the number of digits of the data to be set is also large.

In the conventional offset data setting apparatus mentioned above, it is constructed by the keyboard and the display apparatus and the offset data for the coordinate conversion is stored into the RAM for the coordinate converting process at the time of the initializing process of the control apparatus of the robot, so that there are the following drawbacks.

1. When the offset data is set, the setting apparatus is certainly necessary. The set data cannot be always confirmed.

2. Since the set offset data is stored into the RAM as data for the coordinate converting process at the time of the initializing process of the control apparatus of the robots even when the set value of the offset data is changed during the operation of the robot, in order to check a change in operating position of the robot by the changed offset data without exerting an influence on the operation of the robot, it is necessary to again execute the initializing process of the control apparatus of the robot.

SUMMARY OF THE INVENTION

It is an object of the invention to solve the above problems and to provide a control apparatus of a robot, in which data for compensating an offset value, data which is necessary to search an origin, and the like can be easily certainly set.

To accomplish the above object, according to an embodiment of the invention, there is provided a control apparatus for controlling the operation of a moving member which is movably provided on a base, comprising: (a) first memory means in which a program for the above operation has been stored; (b) data setting means for setting data to control the operation of the moving member, in which the data can be directly observed; (c) second memory means for storing the data; and (d) processing means for executing a process to control the operation of the moving member on the basis of the program and the data.

The above and other objects and features of the present invention will become apparent from the following detailed description and the appended claims with reference to the accompanying drawings.

DETAILED DESCRIPTION OF THE PREFERRED EMBODIMENTS

A preferred embodiment of the invention will be described hereinbelow with reference to the drawings.

Figure 1:
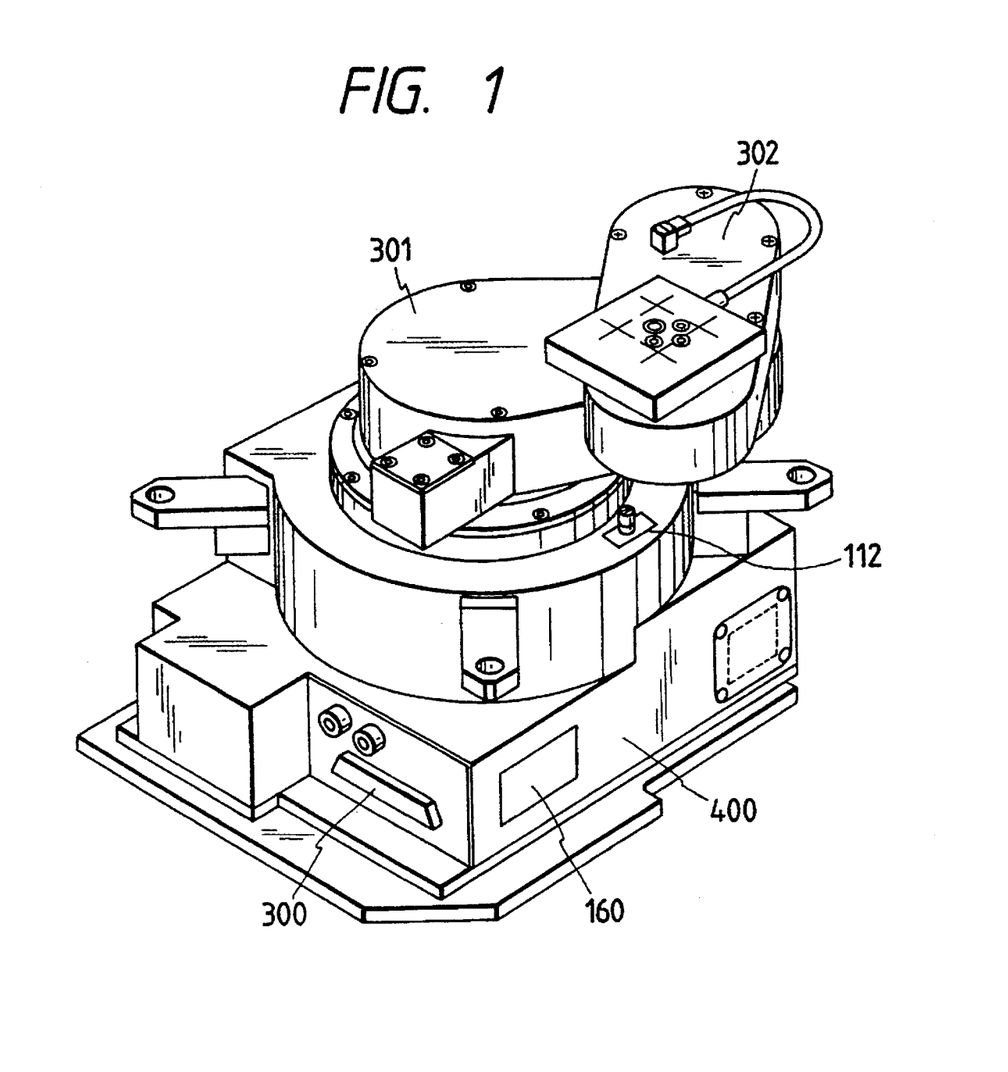
FIG. 1 is a perspective view of a robot apparatus 400 in an embodiment.
Figure 2:
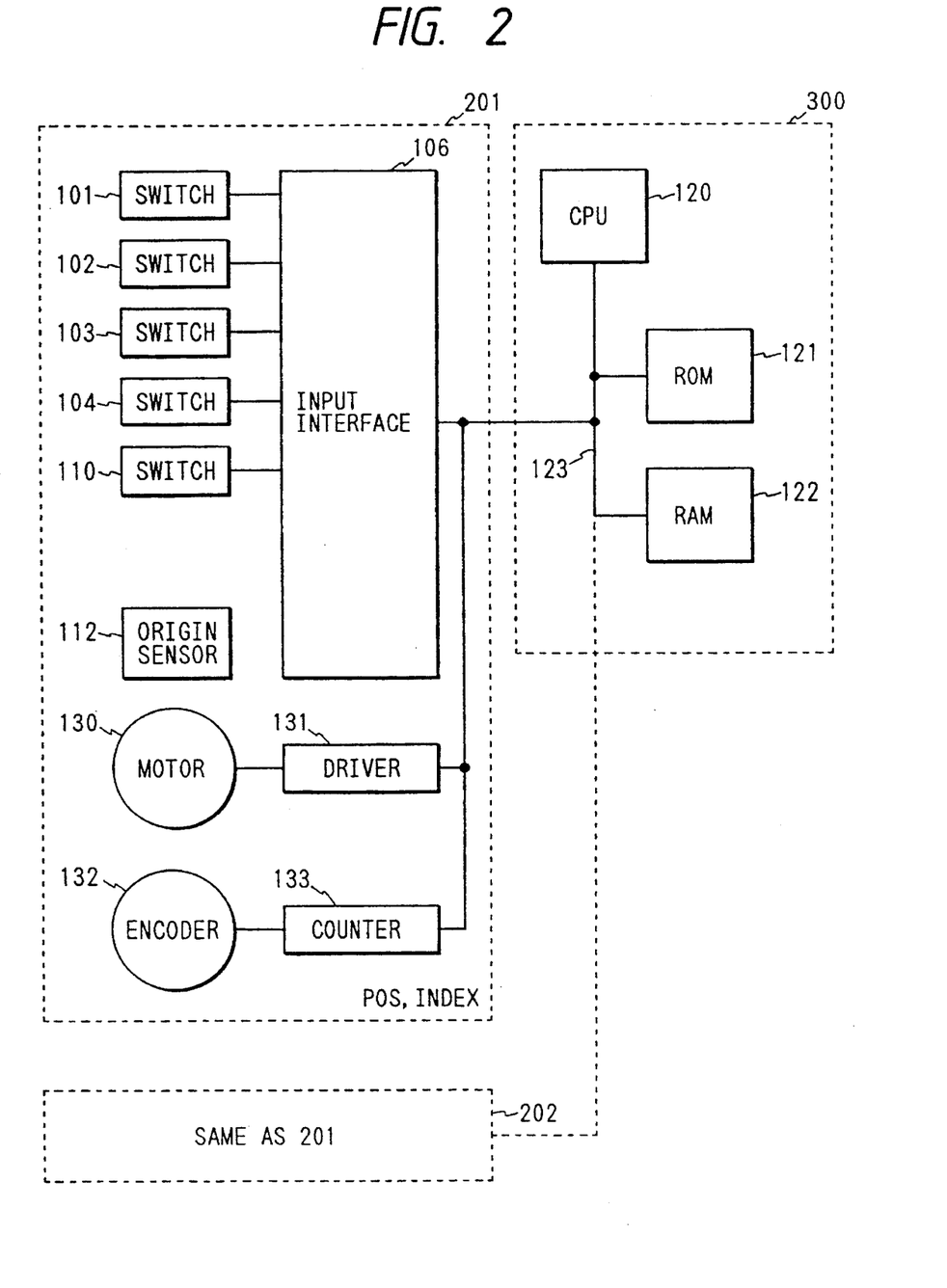
FIG. 2 is a block diagram of a robot system to which the invention is applied.

The embodiment relates to a robot control apparatus 300 for a scalar type robot apparatus having biaxial arms as shown in FIG. 1. A robot system is constructed by the robot control apparatus 300 and a robot apparatus. In the robot system, FIG. 2 shows a connection between a motor unit in which mechanical constructing portions are eliminated from the robot apparatus and the robot control apparatus 300. In addition to an ordinary robot control function, the following two large functions are provided for the robot control apparatus.

(1) Function to search the origin (2) Function to correct the offset

System construction

A construction of the entire robot system of the embodiment will now be described with reference to FIGS. 1 to 4.

In FIG. 2, the control apparatus 300 is connected to two motor units (201, 202) through a bus 123. The reason why the two motor units 201 and 202 are provided is because the robot apparatus of the embodiment has a biaxial arm construction.

The robot control apparatus 300 comprises: a CPU 120 to execute an arithmetic operating process; a ROM 121 in which an origin search program and an offset calculation program have been stored; a RAM 122 to store data; the bus 123 to connect each block; and the like. Various kinds of registers and counter regions which are necessary to control are set in the RAM 122.

The motor unit 201 will now be described. Reference numerals 101 to 104 denote switches to set offset data to realize the function (2) above noted; 106 an input interface for allowing the CPU 120 to read the contents of the switches; 130 a motor to drive the robot; 132 an encoder to detect the rotating position of the motor; 131 a driver to drive the motor; and 133 a counter to count a signal of the encoder 132.

Reference numeral 110 denotes a switch to input an origin search range to realize the function (1) above noted, and 112 indicates an origin sensor to detect the origin position of the arm which is driven by the motor unit.

The motor unit 201 is constructed by the above component elements. The motor unit 202 is also constructed in a manner similar to the motor unit 201.

Figure 3:
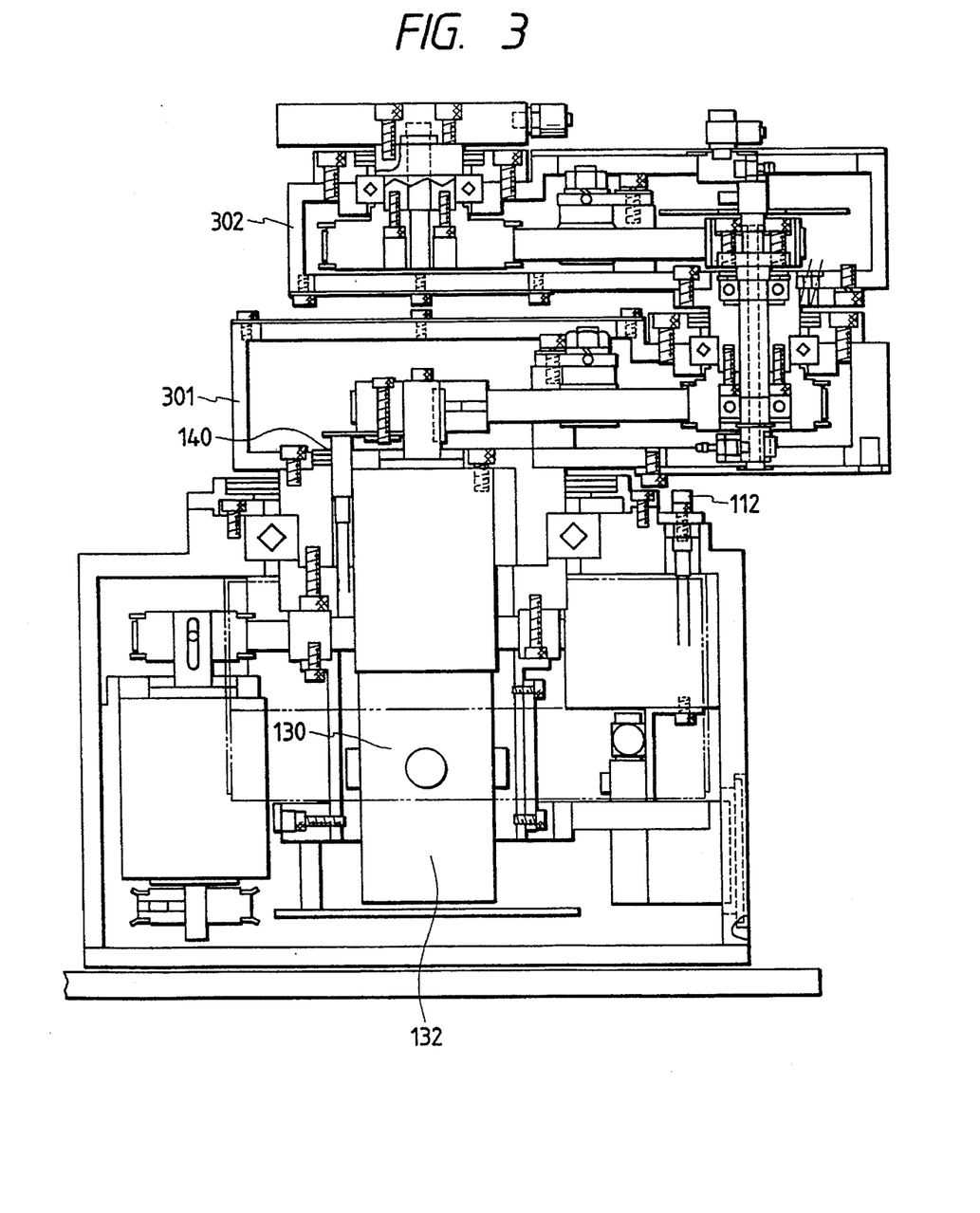
FIG. 3 is a cross sectional view of the robot apparatus 400 of the embodiment.

FIGS. 1 and 3 show the positions of two arms (301, 302), the motor (130, etc.), the encoder (132, etc.), and origin sensors (112, 140) on the side of a robot apparatus 400.

Figure 4:
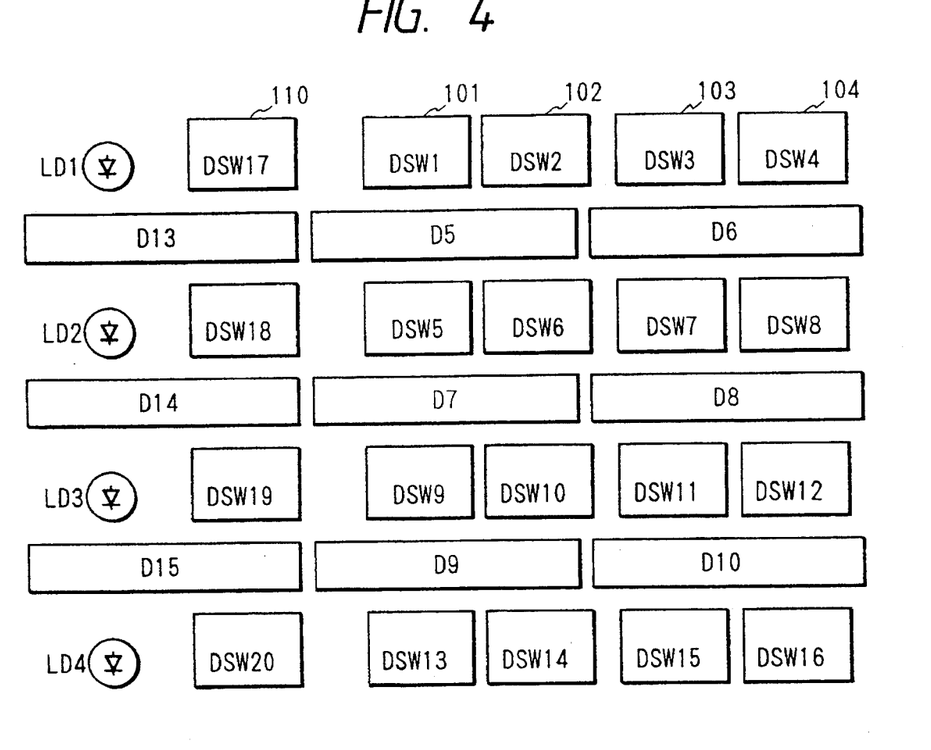
FIG. 4 is a diagram for explaining an arrangement of switches on a switchboard 160.
Figure 5:
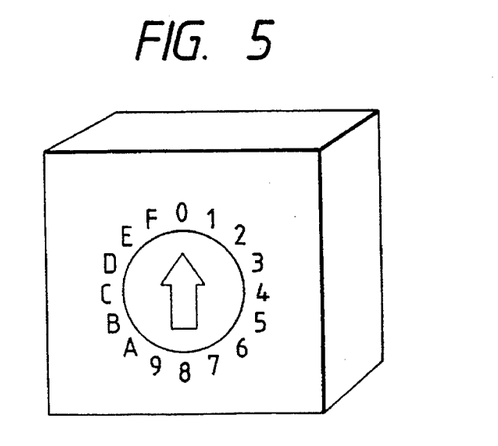
FIG. 5 is a diagram for explaining a construction of each switch.

The data switches 101 to 104 to input the offset amount and the switch 110 to input the origin search range data mentioned above are provided on a switchboard 160 in FIG. 1. The switchboard 160 can be arranged at an arbitrary position so long as it doesn't interfere with the arms when the arms operate and, further, so long as it is not inconvenient for the operator to set data. FIG. 4 shows an arrangement of the switches on the board 160. Each switch is shown as DSW in FIG. 4. As shown in FIG. 5, the switch DSW can set values in a range from 0 to F by a dial. The operator can directly read the set value by seeing the dial. One lateral line of those switches corresponds to one axis. Since two axes are used in the embodiment, the switch groups of two lines from the top are used.

A construction of the entire system has been described above. The origin search operation and the offset amount calculating operation will now be sequentially described hereinbelow in accordance with the order.

Origin search operation

In the control apparatus 300 of the robot, when a power source is turned on, the origin search operation is executed in order to confirm the positions of the robot arms 301 and 302. The origin search operation of the robot arm 301 will now be described hereinbelow.

The CPU 120 executes the processes by the following procedure in accordance with a program (FIG. 6) stored in the ROM 121.

Figure 6:
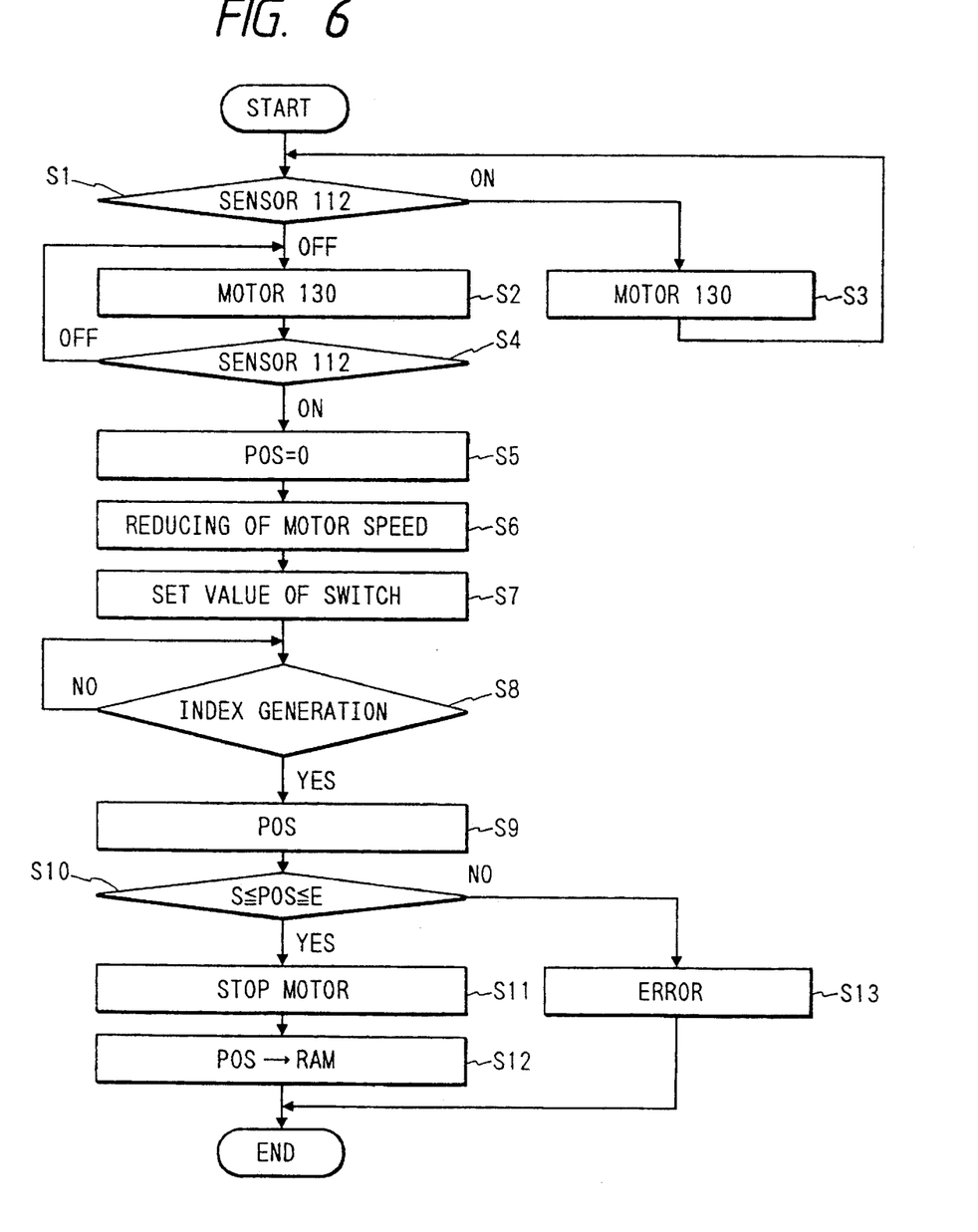
FIG. 6 is a flowchart showing a control procedure for finding out an origin.

The CPU 120 reads out a state of the origin sensor 112 through the input interface 106 in step S1. When the origin sensor 112-has been set to ON, the motor 130 is operated in the forward direction (direction opposite to the direction to search the origin) until the origin sensor 112 is once turned off (step S3). Explanation will now be made on the assumption that the origin sensor 112 is OFF for simplicity of explanation.

The CPU 120 reads the state of the origin sensor 112 through the input interface 106 in step S4. In step S2, the motor 130 is operated until the origin sensor 112 is turned on. When the origin sensor 112 is turned on, the CPU 120 clears a value POS of a counter 133 as an output signal of the encoder 132 to 0. In step S6, a driving speed of the motor 130 is reduced and the monitor of an index signal INDEX from the encoder 132 is started. A preparation for the origin search has been completed at this time point.

Processes in steps S8 to S12 relate to an actual procedure of the origin search. Namely, while monitoring the signal INDEX in step S8, when it is confirmed that the signal INDEX has been generated when the value POS of the counter 133 lies within the origin search rage (S≦POS≦E) set by the operator (step S10), the count value POS at that time is set to the origin position (step S12). The origin search range is inputted from the switch 110 which has already been set in step S7.

When the index signal INDEX of the encoder 132 is generated when the data POS of the counter 133 is less than the "search start count number", S the driving of the motor 130 is stopped and it is determined that there is an error (step S13). Even in the case where the index signal INDEX cannot be detected in spite of the fact that the data POS of the counter 133 is larger than the "search end count number", E, the driving of the motor 130 is similarly stopped and it is determined that there is an error (step S13). In the case where the index signal is generated when the data POS of the counter 133 is equal to or larger than the "search start count number" and is equal to or less than the "search end count number", the driving of the motor 130 is stopped (step S11). The data of the counter 133 at that time is stored as a "search pulse measured value" into the RAM 121 and it is determined that the origin finding operation was normally finished (step S12).

The reason why the "search start count number S" and "search end count number E" are set is to prevent that the origin search end position is made different by one rotation of the motor 130 in the case where the detection of the index signal of the encoder 132 fails due to a cause of noises or the like. The setting of the "search start count number S" and the "search end count number E" will now be described. The above two data are set when the CPU 120 fetches the "search range data" set by the switch 110 through the input interface 106 in step S7.

The above processes are executed for each of the motor units 201 and 202. The origin search operation is executed with regard to each motor.

Figure 7:
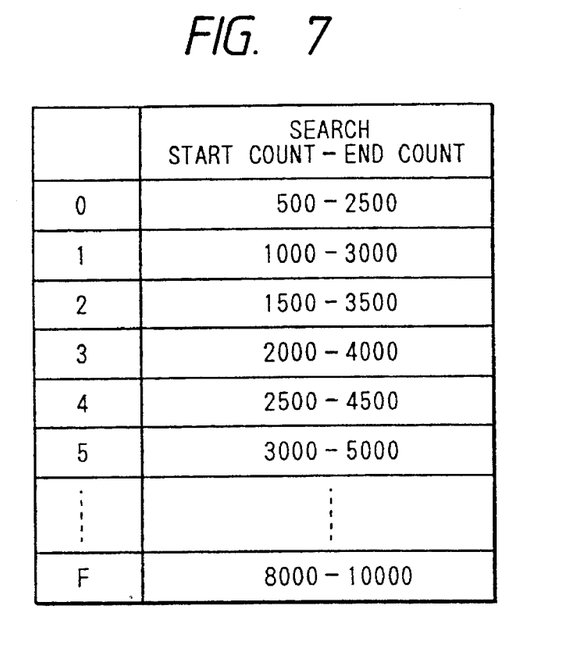
FIG. 7 is a diagram of a table showing a search range of the origin.

The setting operation of the search range is troublesome because the number of digits of numerals which must be inputted is large. Therefore, a conversion table as shown in FIG. 7 is prepared in the ROM 121 and it is constructed so as to enable sixteen kinds of data of 0 to F to be inputted by only the switch 110 (FIGS. 4 and 5). A preset search range is retrieved from the table (FIG. 7) in the ROM 121 by the numerical value of one digit which was inputted.

Overlap of search range

The overalap of the "search start count number S" and the "search end count number E" in the search range data set table will now be described. The "overlap" denotes that in FIG. 7, for instance, in spite of the fact that the count value at the end position of the first search range is equal to 2500, the start count value of the next range is 1000. The search range as shown in the table of FIG. 7 can be set by inputting the numerical value of one digit of one switch 110 as mentioned above. The reasons why those numbers are overlapped will now be described hereinbelow.

That is, the robot control apparatus 300 has a possibility such that the number of pulses "search count measured value POS" until the index pulse of the encoder 132 is generated after the origin sensor 112 was turned on at the time of the origin search operation differs by up to an amount of one rotation of the encoder 132 due to a factor such as errors or the like on manufacturing in dependence on the robot. This is because the encoder 132 generates one signal INDEX per rotation. The example of FIG. 7 relates to the case of using the encoder 132 such that the count number of one rotation is equal to 4000. When it is now assumed that the "search range data" inputted from a switch DSW is set to n (n=0 to 15) and the "search start count number" is set to S and the "search end count number" is set to E, those values can be obtained by the following equations.

$$S=500\times(n+1),$$

$$E=S+4000/2$$

A "search end count number" $E_n$ when the search range data is set to n and a "search start count number" $S_{n+1}$ when the search range data is set to (n+1) have been overlapped and set. Such an overlap setting will now be described hereinbelow.

Figure 8:
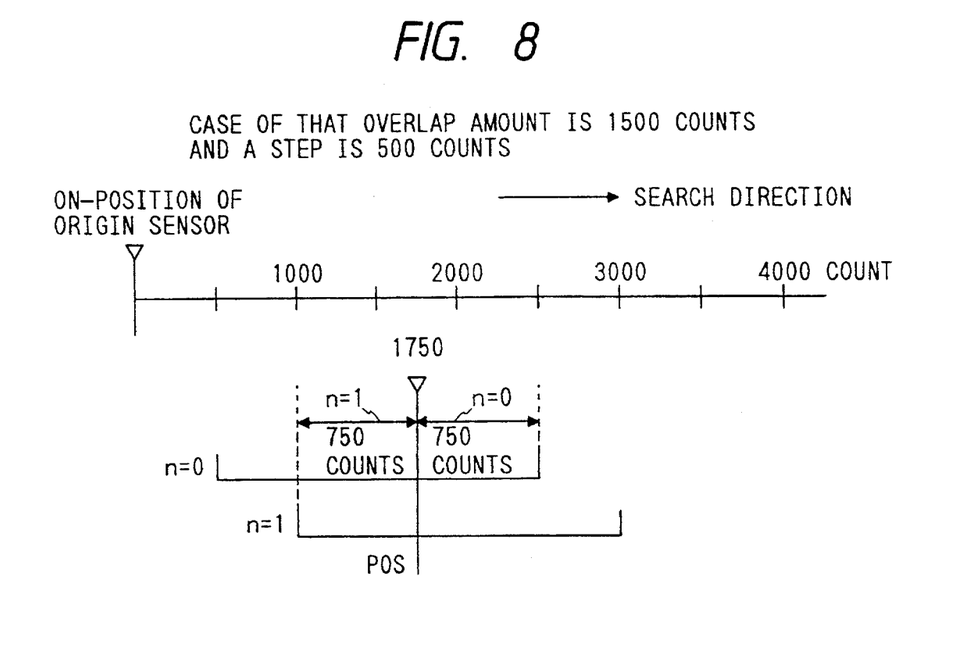
FIG. 8 is a diagram for explaining the reason why the search range overlaps.

In an explanatory diagram of the overlap of the search range of FIG. 8, in the case where the measured "search count measured value POS" is equal to 1750, even when either n=0 or n=1 is set as a "search range data n" to be set, at least 750 counts are obtained as a margin for a variation of the "search count measured value POS". The reason why the margin is set is because there is a possibility such that the "search pulse measured value POS" fluctuates in the case where the response characteristics of the origin sensor 112 change by a temperature change, aging change, or the like. The search range is set on the basis of the data of the origin when it has previously been detected and is used in the subsequent origin search.

The reason why the search range is set to a range from 8000 to 10000 in the table shown in FIG. 7 to set the search range is as follows. That is, in the embodiment, the encoder generates 4000 counts per rotation and it is sufficient to set the search range to a range from 4500 to 6500 even in consideration of the overlap. However, such a range corresponds to the case where n=8 and the value of n (=8) can be expressed when the number of bits is equal to 4. Therefore, although such a wide range is not always necessary, it is set in the embodiment.

Modification of origin search

In the origin search, in the case where an error occurred because of the above reason (step S10), a program such as to execute the retry operation a few times has been stored in the ROM 121 and is executed by the CPU 120, so that the origin finding reliability can be improved.

A process to make an origin search speed high will now be described. In the origin search operation according to the above description, when the origin sensor 112 is turned on, the driving speed of the motor 130 is soon reduced and the index signal INDEX is monitored. Therefore, in the case where the generating position of the index signal INDEX is away from the position at which the origin sensor 112 is turned on, the timing at which the origin search is finished is delayed. Therefore, even when the origin sensor 112 is turned on, the driving speed of the motor 130 is not immediately reduced but when the data of the counter 133 is equal to the "search start count number S", the driving speed of the motor 130 is decreased. Consequently, the origin search can be performed at a high speed.

Effects of the origin search

1. Since the means for setting the data in the search range is constructed by the switch 110 which can be directly read, the set "search range data" can be always confirmed without needing any special means or can be easily changed.

2. A drive amount of the motor until the origin search is finished after the origin sensor was turned on at the time of the origin search operation is set by an origin search range setting switch, so that there is an effect such that the origin search can be certainly performed at a high speed.

3. By selecting and setting the origin search range from among the set values which have previously been overlappingly set, there are effects such that it is sufficient to set one data for one motor and that the reliability of the origin search can be also improved.

Correction of offset

In the system of FIG. 2, the offset is corrected after the origin search was performed. The offset occurs due to differences among the apparatuses which are caused due to errors or the like on manufacturing of the robot. It is necessary to know the offset value in order to correct it.

The offset data is previously obtained by measurements. The offset data obtained is set by the switches 101 to 104 (FIG. 2). It is now assumed that the data of the top digit is set into the switch 101 and that the data is sequentially set hereinafter. It is now assumed that the offset data obtained by the measurements is equal to "1234".

The CPU 120 executes processes by the following procedure in accordance with the program stored in the ROM 112.

The CPU 120 fetches the data of the switches 101 to 104 through the input interface 106. In this case, the fetched data is "1234" and is stored into the RAM 122. The data is used when the coordinate conversion is executed.

The above processes are executed for each of the motor units 201 and 202. The offset data for each motor is stored into the RAM 122.

Figure 9:
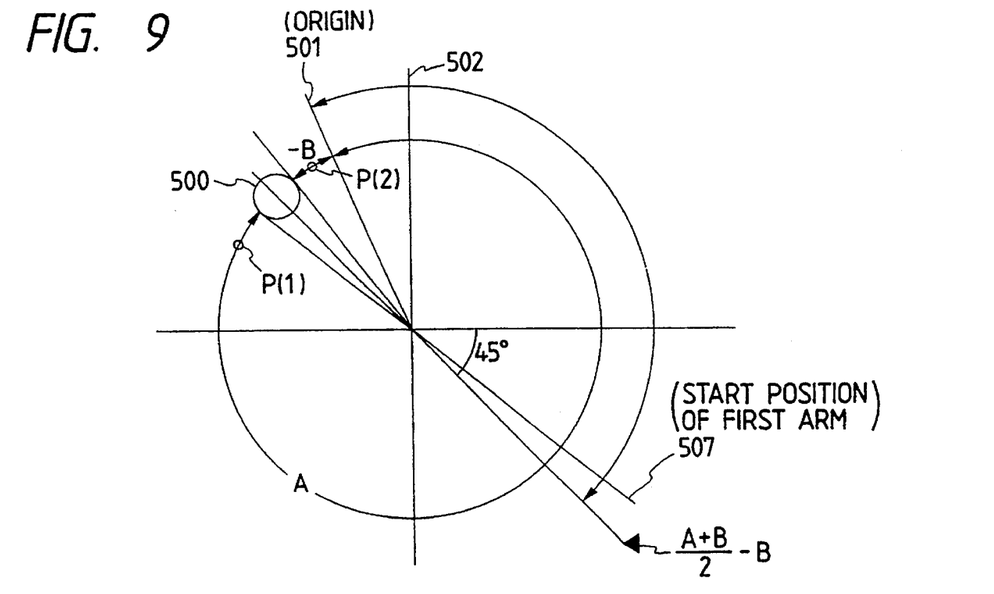
FIG. 9 is a diagram for explaining the principle of the calculation of an offset with respect to the first arm.

A calculating procedure of the offset amount regarding the first arm 301 (axis) after the origin was detected will now be described with reference to FIGS. 9, 10A, and 10B. It is now assumed that the number of pulses which are generated per rotation from the encoder is set to 4000 and that the arm is located at the origin position (501 in FIG. 9).

Step T1:

The current COIN width is saved and the COIN width is set into 500 pulses as a preparation of the offset calculation. The COIN width denotes an allowance range of a position deflection (=instructed value−current value) at the time of the stop of the rotation of the axis.

Step T2:

The current speed integration gain value of a servo circuit is saved and, after that, the gain value is set to 0.

Step T3:
The servo of the axis to be measured is made free.

Step T4:
The axis to be measured is moved in the CW direction to a position which is one millimeter before a stopper (500 in FIG. 9) for calibration. This position is stored as a point P(1). Refer to FIG. 9.

Step T5:
The axis to be measured is moved in the CCW direction to a position which is one millimeter before the stopper for calibration and this position is stored as a point P(2). Refer to FIG. 9.

Step T6:
The servo of the axis to be measured is locked.

Step T7:
The offset value on the P(1) side is measured in steps $T7_{-1}$ to $T7_{-6}$.

Step $T7_{-1}$:
The arm is moved to P(1).

Step $T7_{-2}$:
The arm is moved in the CW direction by a distance of only the number of $P_S$ pulses.

Step $T7_{-3}$:
Wait for about 0.5 second for stability.

Step $T7_{-4}$:
A deflection $\Delta_1$ (=instructed value–current value) at time is read out.

Step $T7_{-5}$:
A check is made to see if the arm has been come into contact with the stopper 500 or not. Specifically speaking, when the absolute value of the deflection is equal to or larger than $P_t$ pulses ($\Delta_1 \geq P_t$), it is decided that the arm has been come into contact with the stopper 500, so that step $T7_{-6}$ follows. If NO ($\Delta_1 < P_t$), the processing routine is returned to step $T7_{-2}$.

Step $T7_{-6}$:
When $\Delta_1 \geq P_t$, the instruction pulse data is set to a movement amount in the CW direction and this amount is expressed by A in FIG. 9.

Step T8:
The offset value on the P(2) side is subsequently measured in steps $T8_{-1}$ to $T8_{-6}$.

Step $T8_{-1}$:
The arm is moved to P(2).

Step $T8_{-2}$:
The arm is moved in the CCW direction by a distance of only the number of $P_S$ pulses.

Step $T8_{-3}$:
Wait for about 0.5 second for stabilization.

Step $T8_{-4}$:
A deflection $\Delta_2$ at this time is read out.

Step $T8_{-5}$:
A check is made to see if the arm has come into contact with the stopper 500 or not in a manner similar to the P(1) side. Specifically speaking, when the absolute value of the deflection is equal to or larger than the $P_t$ pulses ($\Delta_2 \geq P_t$), it is decided that the arm has been come into contact with the stopper 500, so that step $T8_{-6}$ follows. If NO ($\Delta_2 < P_t$), the processing routine is returned to step $T8_{-2}$.

Step $T8_{-6}$:
When $\Delta_2 \geq P_t$, the instruction pulse data is set to a movement amount in the CCW direction and this amount is expressed by B in FIG. 9.

Step T9: An offset amount is obtained in accordance with a predetermined equation by the movement amount A from the origin position in the CW direction and the movement amount B in the CCW direction.

Step T10:
The COIN width and the speed integration gain value of the servo circuit which have been saved in steps T1 and T2 are read out and set.

The offset amount of the first arm mentioned above can be shown by

Offset $A=(A+B)/2-B-300000$

The reason why 300000 is reduced in the offset of the first arm is because a value to be handled becomes too large in the case where the above process is not executed and, in order to avoid it, the offset of the first arm is calculated while setting, as a reference, the position that is away from the diagonal line of the stopper 500 for calibration by 135° in the CCW direction. That is, in the embodiment, since the encoder generates 4000 pulses per rotation and a reduction ratio is set to 1/200, $(200 \times 4000) \times 135°/360° = 300000$ On the other hand, the offset of the second arm 302 is obtained as follows. Since it is fundamentally the same as that in case of the first arm 301, the characteristic portion of the second arm 302 will now be described with reference to FIG. 11.

The offset amount for the first arm 301 of the second arm 302 is obtained by inserting an offset calculating pin 510 into the second arm 302 and by coming into contact with both ends of an offset calculating hole 512 formed in the first arm 301. It is now assumed that the position (movement amount) from an original 504 when the axis is rotated in the CW direction and the pin 510 which was inserted into the second arm 302 is come into contact with an edge portion 512a of the hole 512 is set to A and that the position (movement amount) from the origin 504 when the axis is rotated in the CCW direction and the pin 510 is come into contact with an edge portion 512b of the hole 512 is set to B. In this instance, the offset amount of the second arm 302 is obtained by Offset $B=(A+B)/2$ Specifically speaking, the values of A and B can be obtained by the flowcharts shown in FIGS. 10A and 10B in a manner similar to the case of the first arm. After the offset was calculated, the pin 510 is pulled out from the second arm 302.

Figure 10A:
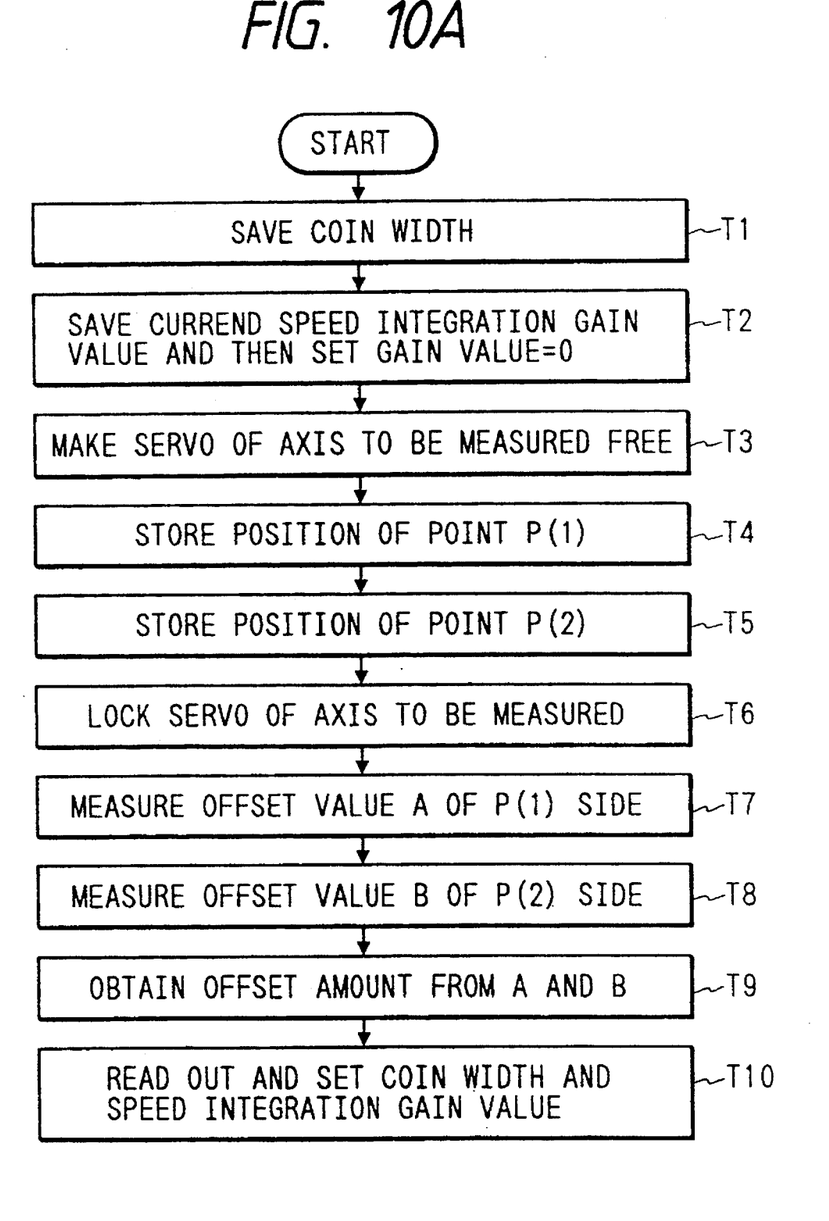
FIG. 10A is a flowchart for calculating an offset.
Figure 10B:
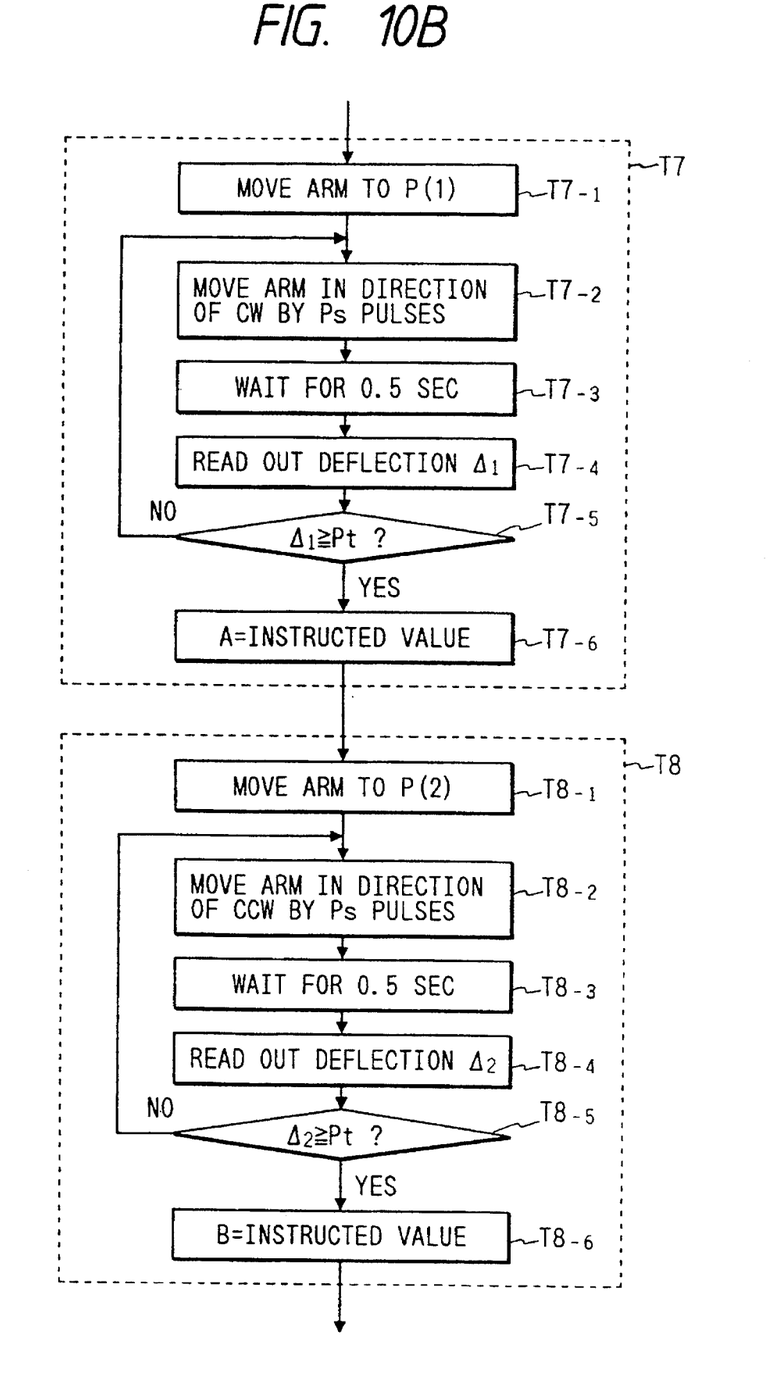
FIG. 10B is a flowchart for explaining further in more detail a part of the flowchart shown in FIG. 10A.
Figure 11:
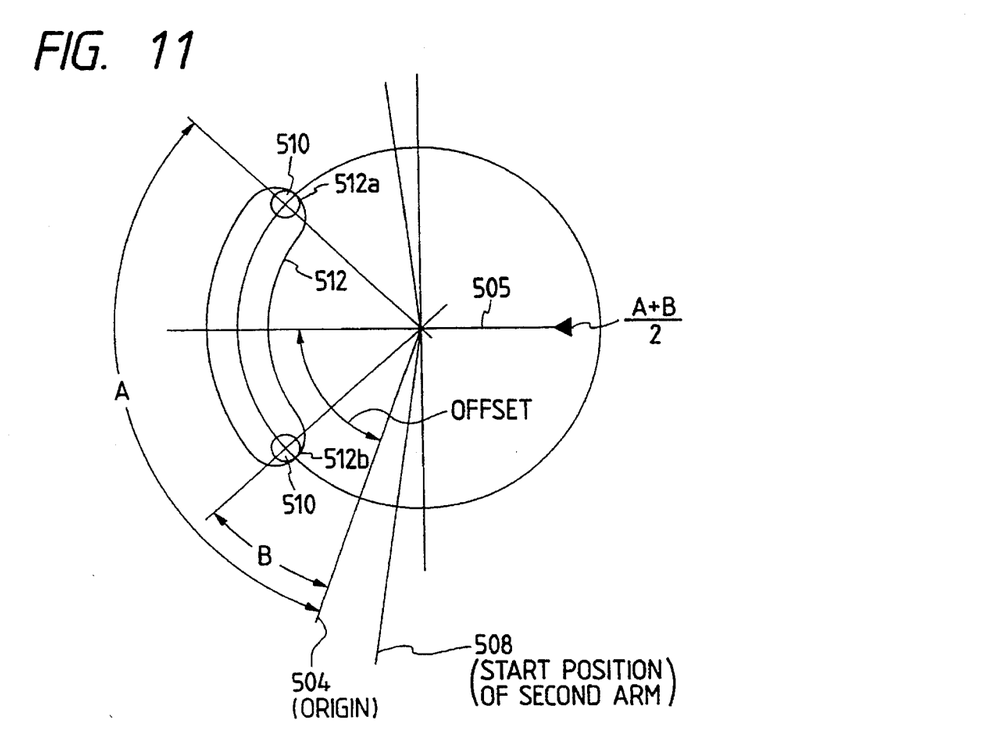
FIG. 11 is a diagram for explaining the principle for calculation of an offset with regard to the second arm.

After the offset amounts are obtained, since the apparatus is returned to the ordinary using state as shown in step T10 in FIG. 10A, the first arm 301 and the second arm 302 are moved to start positions 507 and 508 which are away from reference points 502 and 505 in case of using those arms by predetermined distance.

The offset amounts can be also calculated by the following simple method. That is, the pin is inserted into the second arm as mentioned above and the second arm is rotated to the right and left. The value of the encoder 132 is read out at a timing when a casing of the first arm reaches a predetermined position. Subsequently, the pin is released and the first arm is rotated to the right and left. The value of the encoder 132 is read out at a timing when the head of a bolt (not shown) screwed into a base of the robot apparatus 400 is come into contact with the head of a bolt (not shown) screwed into the lower portion of the first arm.

Effect of offset compensation

According to the offset compensation as described above, since the offset data setting apparatus is constructed by the switches 101 to 104 which can directly be read, the set offset data can be always confirmed without needing any special means.

The offset data set in the switches 101 to 104 is always set as latest data into the RAM 122 by repeating the above operation for every predetermined time. Therefore, by changing the offset data which is set by the switches 101 to 104, the operating position of the robot can be soon changed. Thus, when the offset data is changed because the robot was hit or the like, the data can be corrected on the side of the construction field. There is an effect such that the down time of the robot can be reduced.

As described above, according to the control apparatus of the robot of the embodiment as described above, the data for compensating the offset and the data that is necessary to execute the origin search can be easily and certainly set.

What is claimed is:

1. A robot comprising:
   (a) a moving member which is movably attached to a base; and
   (b) a control apparatus for controlling the operation of said moving member,
   said control apparatus having data setting means for setting origin search data and offset data to control the operation of the moving member, said data setting means providing sensible indication through which set origin search data and set offset data are identifiable.

2. A robot according to claim 1, wherein said control apparatus includes means for determining a reference position of said moving member and wherein said data setting means sets a search range relative to said reference position.

3. A robot according to claim 1, wherein said data setting means is settable to any one of a plurality of search ranges.

4. A robot according to claim 3, wherein said data setting means provides visible indication of a setting thereof corresponding to the search range to which said data setting means is set.

5. A robot according to claim 3, wherein said data setting means comprises a rotary switch, set positions of which provide said visible indication of the search range to which said data setting means is set.

6. A robot according to claim 5, wherein said control means further has memory means for storing a plurality of search range data corresponding to said plurality of search ranges.

7. A robot according to claim 6, wherein said memory means stores said plurality of search range data in a manner such that said ranges are in mutually overlapped relation.

8. A robot according to claim 1, wherein said control apparatus uses said offset data to perform a coordinate conversion.

9. A robot according to claim 8, wherein said data setting means has a plurality of switches for inputting the offset data by each order of magnitude of said offset data.

10. A robot according to claim 9, wherein said data setting means further includes a rotary switch for setting said origin search data.

11. A robot according to claim 1, wherein said moving member comprises a first rotatable arm.

12. A robot according to claim 11, further having a second arm which is rotatably coupled to said first arm.

13. A robot according to claim 12, wherein said second arm includes a hole into which a pin can be fitted and said first arm has a restricting portion to restrict a moving range of the pin fitted into said second arm.

14. A robot according to claim 11, wherein said base has a restricting portion to restrict a moving range of said first arm.

15. A control apparatus for controlling the operation of a moving member that is movably attached to a base, comprising:
   (a) first memory means for storing a program for said operation;
   (b) data setting means for setting data to control the operation of said moving member, said data setting means providing sensible indication through which set data is identifiable;
   (c) second memory means for storing said data; and
   (d) processing means for executing a process to control the operation of the moving member on the basis of said program and said data.

16. An apparatus according to claim 15, wherein said processing means includes means for determining a reference position of said moving member and wherein said data setting means sets a search range relative to said reference position.

17. An apparatus according to claim 16, wherein said data setting means provides visible indication of a setting thereof corresponding to the search range to which said data setting means is set.

18. An apparatus according to claim 16, wherein said data setting means is settable to any one of a plurality of search ranges.

19. An apparatus according to claim 18, wherein said data setting means comprises a rotary switch, set positions of which provide said visible indication of the search range to which said data setting means is set.

20. An apparatus according to claim 19, wherein said control means further has third memory means for storing a plurality of search range data corresponding to said plurality of search ranges.

21. An apparatus according to claim 20, wherein said third memory means stores said plurality of search range data such that said ranges such that said ranges are in mutually overlapped relation.

22. An apparatus according to claim 15, wherein said data setting means further sets offset data of said moving member and wherein said processsing means uses set offset data to perform a coordinate conversion.

23. An apparatus according to claim 22, wherein said data setting means has a plurality of switches for inputting the offset data by each order of magnitude of said offset data.

24. An apparatus according to claim 23, wherein said data setting means further sets origin search data and includes a rotary switch for setting said origin search data.

* * * * *